United States Patent
Tsubaki

(10) Patent No.: US 7,146,160 B1
(45) Date of Patent: Dec. 5, 2006

(54) CALLER IDENTIFICATION LOGGING SYSTEM AND METHOD FOR USE OF SAME

(75) Inventor: Arthur Yuichi Tsubaki, Keller, TX (US)

(73) Assignee: Uniden America Corporation, Ft. Worth, TX (US)

( * ) Notice: Subject to any disclaimer, the term of this patent is extended or adjusted under 35 U.S.C. 154(b) by 153 days.

(21) Appl. No.: 11/052,322

(22) Filed: Feb. 7, 2005

(51) Int. Cl.
  *H04M 3/42* (2006.01)
(52) U.S. Cl. .................. 455/415; 455/406; 455/407; 455/502; 455/426.2
(58) Field of Classification Search ............. 455/415, 455/406, 407, 502, 567, 426.2; 379/142.01, 379/142.18, 112.01, 114.01, 121.04, 121.05
  See application file for complete search history.

(56) References Cited

U.S. PATENT DOCUMENTS 5,363,377 A * 11/1994 Sharpe ................ 370/314
6,223,050 B1 * 4/2001 Roberts, Jr. ............... 455/425
6,282,431 B1 * 8/2001 Konno ...................... 455/425
6,961,420 B1 * 11/2005 DeSalvo ................ 379/355.02

* cited by examiner

*Primary Examiner*—Lester G. Kincaid
*Assistant Examiner*—Dung Lam
(74) *Attorney, Agent, or Firm*—Lawrence R. Youst; Kenneth T. Emanuelson; Danamraj & Youst, P.C.

(57) ABSTRACT

A system (100) for tracking incoming telephone calls includes a first caller identification decoder (166) that decodes caller identification data for a first incoming telephone call including a time stamp having a value reflecting a first time. The system (100) also includes a database (170) for storing the value of the time stamp, a second caller identification decoder (164) that decodes caller identification data relating to a second incoming telephone call initiated at a second time and a frequency counter (156) having a first value at the first time and a second value at the second time. A central processing unit (152) is operable to retrieve the value of the time stamp, identify the first and second values of the frequency counter and thereby determine the second time. A database (170) stores a record reflecting the second time for the second incoming telephone call.

20 Claims, 4 Drawing Sheets

CALLER IDENTIFICATION LOGGING SYSTEM AND METHOD FOR USE OF SAME

TECHNICAL FIELD OF THE INVENTION

The present invention relates, in general, to a caller identification logging system and, more specifically, to a base unit for a multi-line telephone system wherein the base unit has the capability to determine the relative time between incoming calls even if the current time is omitted from the caller identification data.

BACKGROUND OF THE INVENTION

In most areas, the publicly-switched telephone network, or "PSTN", is operable to provide the recipient of a telephone call with caller identification data related to the incoming call. This service is normally an option provided to the customers of a local exchange carrier, or "LEC" and is delivered over the PSTN telephone line to the customer's premises, referred to as the "local loop".

Incoming call handshaking begins with a ring signal sent to customer premises over the PSTN local loop. In the United States, the ring signal is generally a 90-volt alternating current signal transmitted at 20 hertz, transmitted in a two second pulse every six seconds. The caller identification data is generally sent over the PSTN local loop between the first and second ring signal using a frequency-shift keying technique at 1,200 bits per second (1,200 baud). PSTN caller identification data generally includes the telephone number originating the call and a time and date stamp reflecting the current time. The data also commonly includes an ascii string of alphanumeric characters providing additional information regarding the call source.

A caller identification decoder attached to the PSTN local loop, which may be incorporated into a telephone or may be a separate unit, can decode the caller identification signal and provide the customer with information regarding the source of the incoming call. Generally, the decoder will incorporate some degree of memory for storage of caller identification information related to prior incoming calls in a call log. Accordingly, a customer who has been away from the phone for some time can review the call log and determine what phone numbers called that number and at what time.

Similar caller identification functionality may be provided by other telecommunications networks, such as cellular telephone networks, although the information provided over such networks is generally more limited than the caller identification information provided over the PSTN local loop. For example, it is known that not all caller identification signals provide complete time and date data for incoming calls. Accordingly, the caller identification data provided by non-PSTN sources cannot be relied upon for the generation of an accurate incoming call log.

SUMMARY OF THE INVENTION

According to one embodiment, the present invention is a method of providing a time stamp for an incoming call even if the current time is not included in the incoming caller identification data. This method is useful for the generation of a call log reflecting the time of receipt of incoming calls where the caller identification data attached to the call does not provide consistent time data. The method of tracking incoming telephone calls comprises the steps of receiving caller identification data, including a time stamp, for a first incoming telephone call initiated at a first time, identifying a first value of a frequency counter at the first time, storing a first record, including the time stamp and the first value of the frequency counter, receiving caller identification data relating to a second incoming telephone call initiated at a second time, identifying a second value of the frequency counter at the second time, storing a record reflecting the second value of the frequency counter and determining the second time using the first and second values of the frequency counter and the value of the time stamp for the first incoming call.

According to a second embodiment, the present invention is an apparatus for tracking incoming telephone calls comprising a means for receiving caller identification data for a first incoming telephone call initiated at a first time including a time stamp having a value reflecting the first time, a means for identifying a first value of a frequency counter at the first time, a means for storing the value of the time stamp for the first incoming telephone call and the first value of the frequency counter, a means for receiving caller identification data relating to a second incoming telephone call initiated at a second time, a means for identifying a second value of the frequency counter at the second time, a means for storing a record reflecting the second value of the frequency counter and a means for determining the second time using the first and second values of the frequency counter and the value of the time stamp for the first incoming call.

According to a third embodiment, the present invention is a system for tracking incoming telephone calls comprising a first caller identification decoder operable to decode caller identification data for a first incoming telephone call initiated at a first time including a time stamp having a value reflecting the first time, a second caller identification decoder operable to decode caller identification data relating to a second incoming telephone call initiated at a second time, a frequency counter having a first value at the first time and a second value at the second time, a database for storing the value of the time stamp for the first incoming telephone call, the first value of the frequency counter and the second value of the frequency counter and a central processing unit operable to retrieve the value of the time stamp for the first incoming telephone call, to identify the first value of the frequency counter at the first time, to identify the second value of the frequency counter at the second time and to determine the second time using the first and second values of the frequency counter and the value of the time stamp for the first incoming telephone call.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE DRAWINGS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

The present invention provides for a system, method and apparatus for generating an accurate incoming call log even where time information is not consistently provided by one or more telephone networks. The present invention is described below in connection with a telephone system operable to receive incoming calls from both a PSTN local loop and a cellular telephone network for purposes of illustration, but those of skill in the art will appreciate that the teachings of the present invention may be employed in other contexts.

Figure 1:
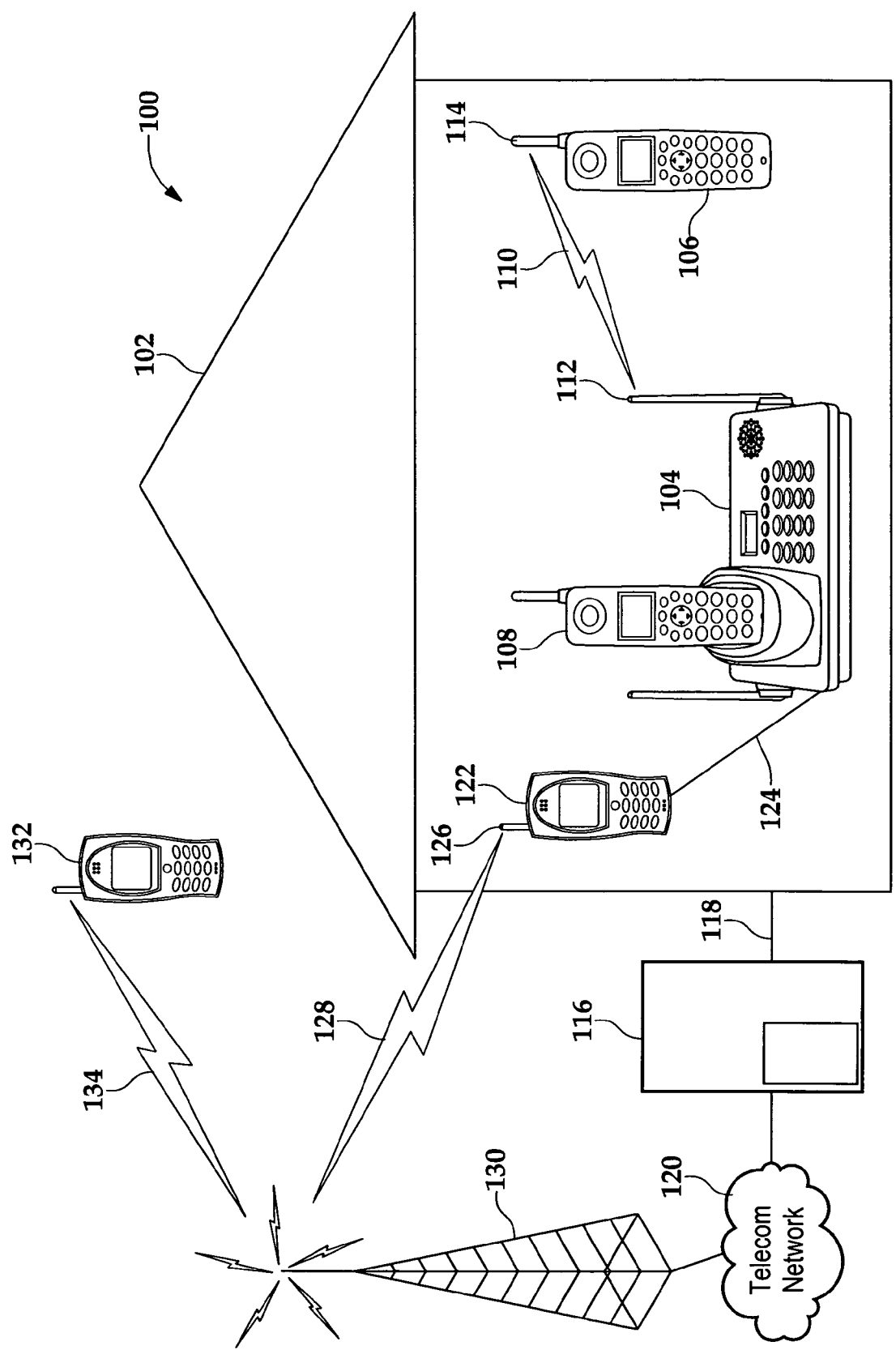
FIG. 1 is an architectural layout of a multi-line telephone system incorporating a cellular telephone, a base unit and a cordless handset according to certain embodiments of the present invention.
Figure 2:
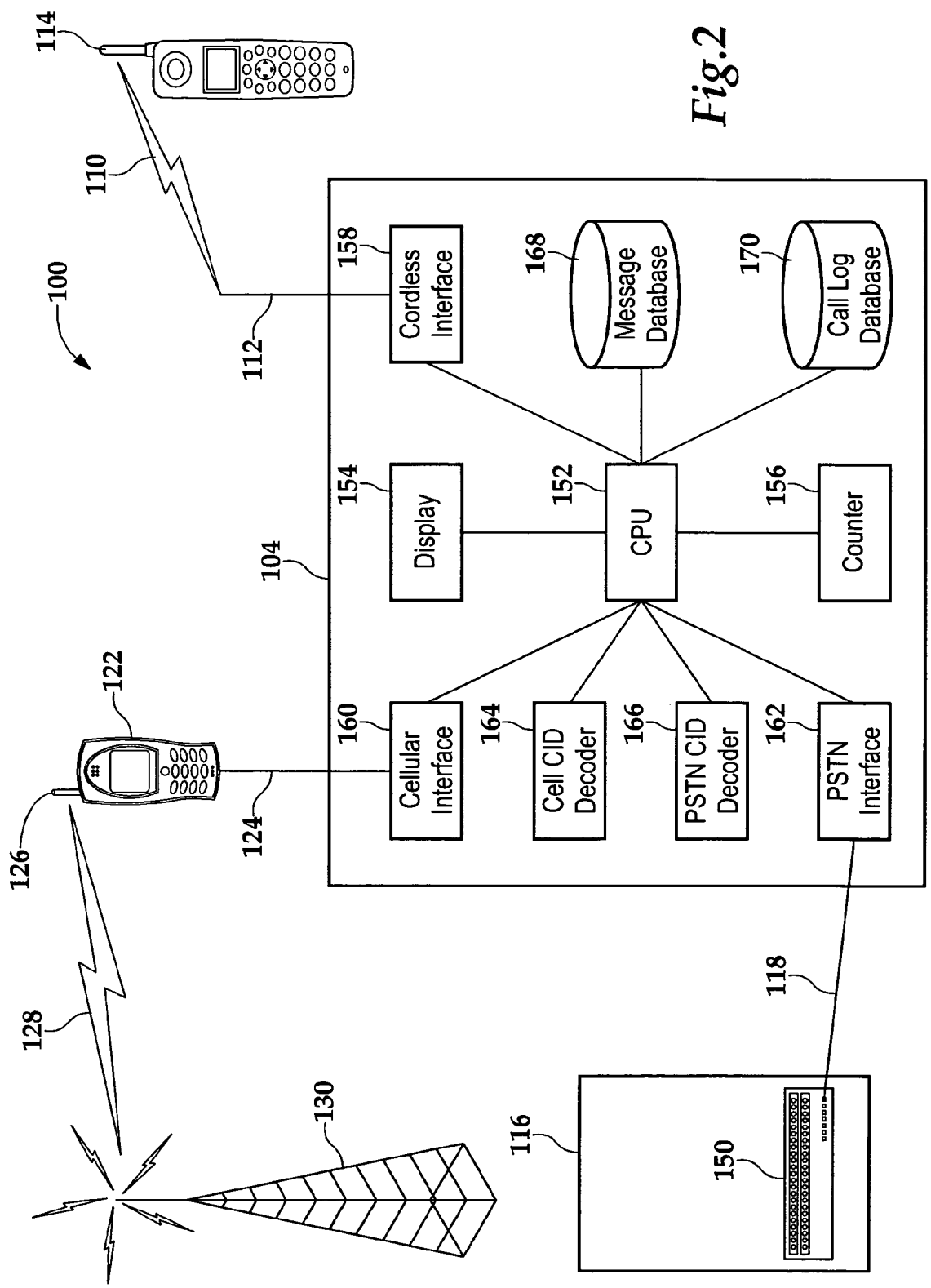
FIG. 2 is a schematic view of a base unit operably connected to a cellular telephone and a cordless handset according to certain embodiments of the present invention.

Turning initially to FIGS. 1 and 2, FIG. 1 depicts a multi-line telephone system 100 in a home 102 incorporating a telephone base unit 104 operable to receive incoming calls through a local loop 118 and a wireless link 128. Base unit 104 is operable to store caller identification received through all channels in one or more call logs, as described below. FIG. 2 is a schematic view of base unit 104, showing its interfaces to local loop 118, cellular telephone 122 and cordless handset 106.

System 100 includes a pair of cordless handsets 106, 108 which act as the primary user interfaces for system 100. Cordless handset 108 is shown cradled within base unit 104, while cordless handset 106 is remote from base unit 104 and connected via cordless interface 158 and cordless link 110 between antenna 114 of cordless handset 106 and antenna 112 of base unit 104. Cordless link 110 carries incoming and outgoing voice signals between base unit 104 and cordless handset 106, and will generally also transmit dial codes and other data between base unit 104 and cordless handset 106. Whenever cordless handset 108 is remote from the base unit 104, a cordless link (not shown) similar to cordless link 110 will be established between base unit 104 and cordless handset 108.

Base unit 104, and specifically PSTN interface 162, communicates with switch 150 at PSTN central office 116 via PSTN local loop 118. Switch 150 within PSTN central office 116 is in turn operably connected to a larger telephone network 120. PSTN local loop 118 is generally a physical electrical connection incorporating a copper wire pair. In certain embodiments, all or a portion of PSTN local loop 118 could involve RF or optical signal transmission components, or could represent one discrete signal among others on a common line. In certain embodiments, home 102 may have multiple incoming PSTN lines, in which case there may be additional connections (not shown) between PSTN central office 116 and PSTN interface 162 of base unit 104. Any and all of these variations are encompassed within the spirit and scope of the present invention.

When a call is made to the telephone number assigned to PSTN local loop 118, PSTN central office 116 will transmit a ring signal indicating an incoming telephone call over PSTN local loop 118, which will be received by base unit 104 and any other device connected to local loop 118. Subsequent to transmission of the first ring signal, PSTN central office 116 will transmit caller identification data for the incoming call over PSTN local loop 118. This data will include, at a minimum, the telephone number from which the call originated and the date and time of the call origination. Upon receipt and decoding of this data by PSTN caller identification decoder 166, a portion of the data is stored in database 170 within base unit 104, and all or a part of the data may be transmitted on to cordless handsets 106, 108 by cordless interface 158. Where system 100 includes multiple incoming PSTN lines, the base unit 104 may also identify to cordless handsets 106, 108 the PSTN line over which the incoming call is being received. Cordless handsets 106, 108 and base unit 104 may communicate this data to a user by a variety of methods, including distinct ringtones, distinct images, distinct messages, or a combination of one or more of the above.

In the embodiment shown in FIGS. 1 and 2, the capability to communicate directly with the PSTN central office 116, represented by PSTN interface 162, is built in to base unit 104. This capability can be included in base unit 104 owing to the simplicity and low cost of the necessary components of PSTN interface 162 and the wide standardization inherent to publicly-switched telephone networks. As described above, in addition to having the capability to receive incoming calls through one or more "land lines" such as PSTN local loop 118, base unit 104 is also operable to receive incoming calls through one or more cellular networks via cellular interface 160. Such a network is shown in FIGS. 1 and 2 including a cellular tower 130 connected to cellular telephones 122, 132 through wireless links 128, 134 respectively as well as to telecommunications network 120.

Owing partly to the lack of standardization among cellular telephone networks, the non-trivial cost of cellular interface components and the fact that cellular account data must be specifically programmed into each cellular component, base unit 104 does not incorporate the capability to communicate directly with cellular tower 130 via a direct wireless link. Instead, base unit 104 communicates with cellular tower 130 through a wireless link 128 established between the antenna 126 of cellular telephone 122 and cellular tower 130. Base unit 104 communicates with cellular telephone 112 through cellular interface 160 by means of a cellular telephone link 124. In certain embodiments, cellular telephone link 124 may be a physical cable. In other embodiments, cellular telephone link 124 may represent a radio frequency or optical connection, such as an IEEE 802.11 interface or an IrDA protocol infrared connection. In certain embodiments, telephone link 124 is an IEEE 802.15 interface, also known as a BLUETOOTH (TM) interface.

Without respect to the connection method employed for cellular telephone link 124, caller identification data for incoming cellular telephone calls is communicated to cellular caller identification decoder 164 of base unit 104 over cellular telephone link 124 in a similar manner to that described above with respect to incoming PSTN calls. There is, however, a significant distinction between the caller identification data generally received from the PSTN central office 116 and the caller identification data generally received from the cellular tower 130. In general, cellular telephone networks do not transmit time data as part of the caller identification data. Accordingly, neither the relative nor the absolute time at which an incoming cellular telephone call is received can be determined from the caller identification data associated with that call. As such, the relative or absolute time at which an incoming cellular telephone call is initiated must be determined by some other method, as described below.

In addition to the functional components of base unit 104 specifically referenced above, base unit 104 may incorporate additional internal components, some of which are depicted in FIG. 2. These components include a central processing unit 152 operably connected to the other functional components of base unit 104, a frequency counter 156 and a display module 154. Frequency counter 156 is particularly relevant to the present invention, as described below. Base unit 104 may also incorporate a message database 168 for storing incoming messages. Base unit 104 may incorporate additional functional components as a particular application dictates, such as one or more system clocks, user input components or one or more additional display modules, as examples.

Figure 3:
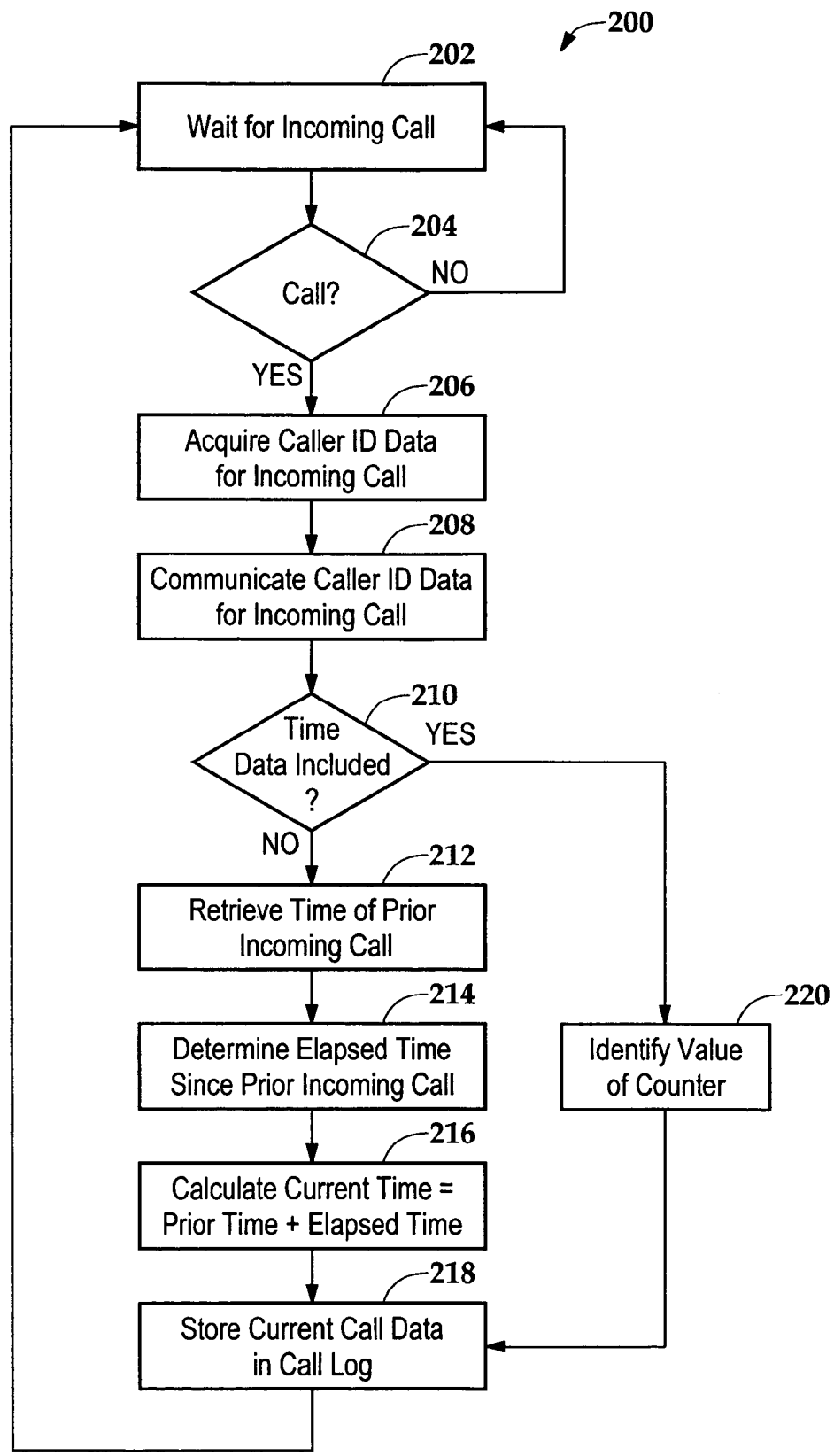
FIG. 3 is a flow chart depicting a method of logging incoming telephone calls according to certain embodiments of the present invention.

As described above, although caller identification data associated with incoming PSTN calls reaching base unit 104 will generally include time data, caller identification data associated with incoming cellular calls generally will not. Accordingly, base unit 104 incorporates a method of assigning relative and/or absolute time data to such calls. FIG. 3 is a flow chart 200 depicting one embodiment of such a method.

Process flow begins at block 202, where the central processing unit 152 of base unit 104 waits for an incoming call. Until an incoming call is received, process flow cannot proceed past decision block 204. Once an incoming call is received, process flow proceeds past decision block 204 to block 206, at which point the central processing unit 152 receives caller identification data from the respective caller identification decoder (164 or 166). Once received, this data is communicated to display 154 and handsets 106, 108, in block 208. As discussed above, this information may then be broadcast by a variety of visual means or auditory means, or a combination of several such means, as the application dictates.

In decision block 210 the central processing unit 152 determines if time data is included in the incoming caller identification data. If time data is included, then process flow continues to block 220, where the value of the frequency counter 156 is identified in order to provide correspondence between the time of the current incoming call and the value of the frequency counter 156. Identification of the value of the frequency counter 156 may be accomplished by a number of methods. For example, the value of the frequency counter 156 could be reset to zero. Alternately, the present value of the frequency counter 156 could be stored in order to provide a reference point for comparison to a point in the future. This identified value of the frequency counter 156 is then associated with the incoming call. Where the value of the frequency counter 156 is identified by resetting the frequency counter 156 to zero, it may not be necessary to store the value in a separate memory location.

After identification of the value of the frequency counter 156 in block 220, the process then proceeds to block 218 where the caller identification data is stored and, in some implementations, the value of the frequency counter 156 is stored, for example, in the call log database 170 as well as in one or more other locations within base unit 104 or cordless handsets 106, 108.

If time data is not included within the incoming caller identification data at block 210, the process flow continues to block 212. In block 212, the central processing unit 152 retrieves a record indicating the time of at least one prior incoming call and the associated prior value of the frequency counter 156. The record may relate to the immediate prior incoming call, or may relate to another prior incoming call. In block 214, the central processing unit 152 retrieves the current value of the frequency counter 156 and compares this value to the prior value of the frequency counter 156 associated with the prior incoming call to determine the time elapsed since the time of the prior incoming call for which time data was retrieved in block 212. Again, if the frequency counter 156 is consistently reset to zero whenever a new caller identification time stamp is received, there is no need to retrieve the prior value of the frequency counter 156. Using the time of the prior call and the subsequently elapsed time, the current time can be determined, as shown in block 216. Process flow then continues to block 218 where the data for the current call is stored and returns to block 202 to wait for additional incoming calls. In alternate embodiments, the system 100 may not retrieve incoming time data for prior calls in order to establish an absolute time for incoming calls. In such embodiments, system 100 may instead use the data from frequency counter 156 solely for the purpose of referencing incoming call times relative to one another rather than to an absolute time reference.

Figure 4:
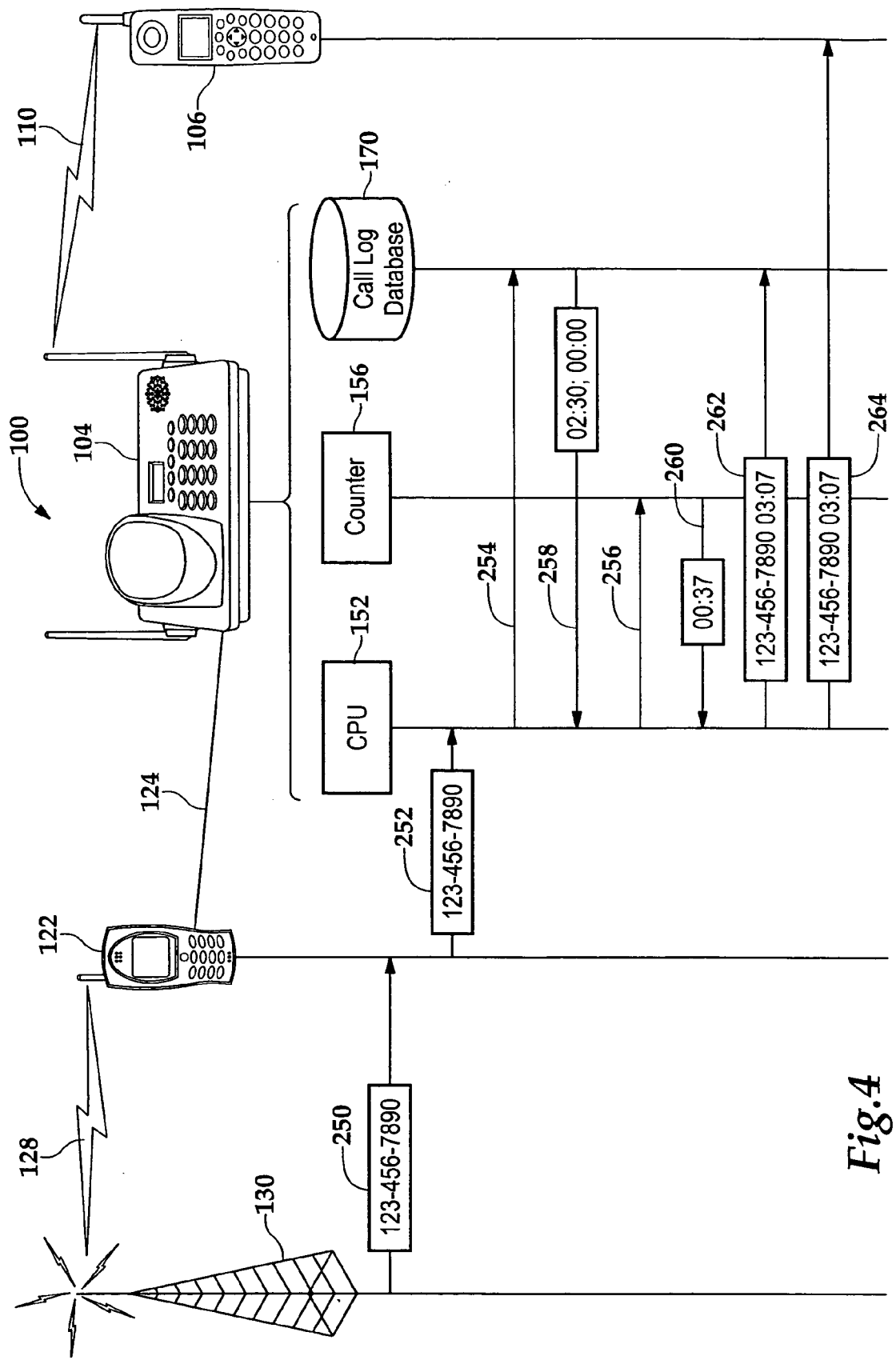
FIG. 4 is a message flow diagram depicting the flow of communications between the components of the system of FIG. 1.

FIG. 4 is an exemplary message flow diagram depicting the flow of communications between the components of the system of FIG. 1 under a particular set of circumstances. The initial communication is a transmission of a caller identification signal 250 incorporating a 10-digit telephone number from cellular tower 130 to cellular telephone 122 over wireless link 128. The telephone number is repeated in message 252 from the cellular telephone 122 to the central processing unit 152 within base unit 104 over cellular link 124. As described above with reference to FIG. 3, upon receipt of message 252, the central processing unit 152 will determine that the incoming caller identification data does not include a time stamp. Accordingly, the central processing unit 152 sends a query 254 to call log database 170 requesting the time of a particular prior incoming call having a known time associated with it and the prior value of the frequency counter 156 associated with that prior incoming call. The central processing unit 152 also sends a query 256 to frequency counter 156 requesting the current value of frequency counter 156.

In the illustrated embodiment, call log database 170 sends response 258 to query 254 which contains a time stamp of 02:30 and a frequency counter value of 00:00. Similarly, frequency counter 156 sends a response 260 to query 256 which contains a value of 00:37. Using this data, central processing unit 152 is able to determine the time of the current incoming call by comparing the 00:37 current value from the frequency counter 156 to the 00:00 prior value of the frequency counter 156 associated with the prior incoming call and adding the difference (00:37−00:00=00:37) to the time stamp for the prior call (02:30+00:37=03:07). Central processing unit 152 is then able to generate a record reflecting the time of the current incoming telephone call. Message 262 to call log database 170 and message 264 to handset 106 are generated reflecting the content of this record. As above, the retrieval of prior time data from call log database 170 may or may not be performed depending on the particular embodiment. Where the prior time data is not retrieved, the current value of the frequency counter 156 may be retrieved and stored in order to allow the base unit 104 to later determine the relative time between the stored calls and the correct sequence of the incoming calls.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of tracking incoming telephone calls comprising the steps of:
   receiving caller identification data, including a time stamp, for a first incoming telephone call initiated at a first time;
   identifying a first value of a frequency counter at the first time;
   storing a first record, including the time stamp and the first value of the frequency counter;
   receiving caller identification data relating to a second incoming telephone call initiated at a second time;
   identifying a second value of the frequency counter at the second time;
   storing a record reflecting the second value of the frequency counter; and
   determining the second time using the first and second values of the frequency counter and the value of the time stamp for the first incoming call.

2. The method as recited in claim 1 wherein the first incoming telephone call is received via a first communications channel and the second incoming telephone call is received via a second communications channel.

3. The method as recited in claim 2 wherein the first communications channel is a local loop of a publicly-switched telephone network.

4. The method as recited in claim 2 wherein the second communications channel is a cellular telephone link.

5. The method as recited in claim 1 wherein the first time is prior to the second time.

6. The method as recited in claim 1 wherein identifying a first value of a frequency counter further comprises resetting the frequency counter to zero.

7. The method as recited in claim 1 wherein the second time is determined by adding the difference of the first and second values of the frequency counter to the value of the time stamp for the first incoming call.

8. An apparatus for tracking incoming telephone calls comprising:
   a means for receiving caller identification data for a first incoming telephone call initiated at a first time including a time stamp having a value reflecting the first time;
   a means for identifying a first value of a frequency counter at the first time;
   a means for storing the value of the time stamp for the first incoming telephone call and the first value of the frequency counter;
   a means for receiving caller identification data relating to a second incoming telephone call initiated at a second time;
   a means for identifying a second value of the frequency counter at the second time;
   a means for storing a record reflecting the second value of the frequency counter; and
   a means for determining the second time using the first and second values of the frequency counter and the value of the time stamp for the first incoming call.

9. The apparatus as recited in claim 8 wherein the first incoming telephone call is received via a first communications channel and the second incoming telephone call is received via a second communications channel.

10. The apparatus as recited in claim 9 wherein the first communications channel is a PSTN local loop.

11. The apparatus as recited in claim 9 wherein the second communications channel is a cellular telephone link.

12. The apparatus as recited in claim 8 wherein the first time is prior to the second time.

13. The apparatus as recited in claim 8 wherein the first value of the frequency counter is set to zero.

14. The apparatus as recited in claim 8 wherein the second time is determined by adding the difference of the first and second values of the frequency counter to the value of the time stamp for the first incoming call.

15. A system for tracking incoming telephone calls comprising:
    a first caller identification decoder operable to decode caller identification data for a first incoming telephone call initiated at a first time including a time stamp having a value reflecting the first time;
    a second caller identification decoder operable to decode caller identification data relating to a second incoming telephone call initiated at a second time;
    a frequency counter having a first value at the first time and a second value at the second time;
    a database for storing the value of the time stamp for the first incoming telephone call, the first value of the frequency counter and the second value of the frequency counter; and
    a central processing unit operable to retrieve the value of the time stamp for the first incoming telephone call, to identify the first value of the frequency counter at the first time, to identify the second value of the frequency counter at the second time and to determine the second time using the first and second values of the frequency counter and the value of the time stamp for the first incoming telephone call.

16. The system as recited in claim 15 wherein the first incoming telephone call is received via a first communications channel and the second incoming telephone call is received via a second communications channel.

17. The system as recited in claim 16 wherein the first communications channel is a local loop of a publicly-switched telephone network.

18. The system as recited in claim 16 wherein the second communications channel is a cellular telephone link.

19. The system as recited in claim 15 wherein the first time is prior to the second time.

20. The system as recited in claim 15 wherein the second time is determined by adding the difference of the first and second values of the frequency counter to the value of the time stamp for the first incoming call.

* * * * *